United States Patent
Griffin et al.

(10) Patent No.: US 7,664,916 B2
(45) Date of Patent: Feb. 16, 2010

(54) GLOBAL SMARTCARD CACHE METHODS AND APPARATUSES

(75) Inventors: Daniel C. Griffin, Seattle, WA (US); Eric C. Perlin, Redmond, WA (US); Klaus U. Schutz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1257 days.

(21) Appl. No.: 10/752,745

(22) Filed: Jan. 6, 2004

(65) Prior Publication Data

US 2005/0149476 A1    Jul. 7, 2005

(51) Int. Cl.
    *G06F 12/00* (2006.01)
(52) U.S. Cl. .................. 711/115; 711/129; 711/133; 711/141; 711/144; 711/E12.069; 711/E12.072
(58) Field of Classification Search .................. None
    See application file for complete search history.

(56) References Cited

U.S. PATENT DOCUMENTS

| | | | |
|---|---|---|---|
| 5,461,217 A | 10/1995 | Claus | |
| 6,108,789 A | 8/2000 | Dancs et al. | |
| 6,112,246 A * | 8/2000 | Horbal et al. | 709/230 |
| 6,535,997 B1 | 3/2003 | Janson et al. | |
| 6,865,647 B2 * | 3/2005 | Olarig et al. | 711/129 |
| 2002/0026578 A1 * | 2/2002 | Hamann et al. | 713/159 |
| 2003/0080852 A1 | 5/2003 | Harris | |
| 2003/0093670 A1 | 5/2003 | Matsubayashi et al. | |
| 2003/0126441 A1 * | 7/2003 | Laux et al. | 713/168 |
| 2005/0076198 A1 | 4/2005 | Skomra et al. | |

OTHER PUBLICATIONS

Derfler et al, "How Networks Work", Bestseller Edition, 1996, Ziff-Davis Press.
Gralla, "How the Internet Works", Millennium Edition, 1999, Que Corporation, pp. vi-xi, 1-3, 8-11, 808-824.
Muller, "Desktop Enclopedia of Internet", 1999, Artech House Inc., pp. 233-246, and 539-559.
Rankl et al., "Smart Card Handbook", Second Edition, 2000, Wiley & Sons, pp. i-xxviii, 1-25, 639-746.
White, "How Computers Work" Millennium Edition, 1999, Que Corporation.
Chen, "Java Card Technology for Smart Cards", Prentice Hall, Jun. 6, 2000, 20 pgs.
Rankl et al., "Smart Card Handbook", Second Edition, 2000, Wiley & Sons, pp. v-x, 91-158, 197-200, 306-311, 383-442, and 527-570.

* cited by examiner

*Primary Examiner*—Reginald G Bragdon
*Assistant Examiner*—Baboucarr Faal
(74) *Attorney, Agent, or Firm*—Lee & Hayes, PLLC (57) ABSTRACT

Methods and apparatuses are provided for use with smartcards or other like shared computing resources. A global smartcard cache is maintained on one or more computers to reduce the burden on the smartcard. The global smartcard cache data is associated with a freshness indicator that is compared to the current freshness indicator from the smartcard to verify that the cached item data is current.

35 Claims, 5 Drawing Sheets

GLOBAL SMARTCARD CACHE METHODS AND APPARATUSES

TECHNICAL FIELD

The present invention relates generally to computers and like devices, and more particularly to improved methods and apparatuses that provide global caches for use with smartcards and other like sharable computing resources.

BACKGROUND

Smartcards are portable devices that include logic and memory circuitry configured to interact with computers and other like devices. In a typical computer implementation, a computer includes or is otherwise connected to a smartcard interface device that operatively interacts with the smartcard to provide connectivity to the circuitry of the smartcard for applications and/or other processes operating within the computer. Once the applicable connections are made, the smartcard circuitry can operate as designed/programmed and begin processing requests received from the computer and/or otherwise support the operations of the computer.

Smartcards and other like mechanisms can be configured to support a wide variety of functions. By way of example, a smartcard may be configured to support user verification, service authorization and cryptographic processes. The circuitry on such smartcards typically includes processing logic and static memory that allows secret/preparatory data to be processed and stored within the smartcard in a secure manner.

Currently there are a variety of different manufactures designing and building smartcards, and hence there are different circuits with these smartcards. The smartcards are each designed to comply with certain standards, e.g., regarding the physical design, power requirements, communication interface, etc. This standardization allows different smartcards to utilize common smartcard interface devices, such as smartcard reader/writer devices that connect to computers.

Once a smartcard is operatively coupled to a computer (or other like device) then processes operating within the computer can send access requests to the smartcard through the established communication interface. For example, a software application running on a computer processing unit may request access to the smartcard by generating a smartcard access request to which the smartcard is responsive in some manner. For example, a smartcard may respond to the command(s) stated in a smartcard access request by processing some data and outputting data to the requesting software application, process and/or other like entity.

Since a smartcard can be accessed by a plurality of such entities, there is a need to control access to the smartcard. Typically, a smartcard is designed to handle only one request, or transaction, at a time. As such, arbitration logic or other like logic is usually provided to prevent multiple simultaneous transactions/access attempts. Such arbitration logic may be provided, for example, within the computer and/or smartcard interface device.

It has been found that at certain times smartcard operations can be relatively slow due in part to the amount of card input/output (I/O) being performed. For example, data read from a smartcard is typically only stored, or cached, locally to the consumer of the data. Here, for example, the consumer of the smartcard data may be a process running on a computer or other like computing device. In some situations smartcard data is not cached at all.

Therefore, certain pieces of smartcard data must be re-read every time the data is needed.

Most contemporary smartcard scenarios are adversely affected by such smartcard caching, or lack thereof, behavior. One example of a common scenario is user authentication, which for these reasons may be uncomfortably slow and therefore is viewed by many as less-desirable than more common, but potentially less secure, alternatives, such as, for example, password-based authentication.

Moreover, even when smartcard data is cached, no prior solution exists for keeping the data consistent and secure across multiple consumers, e.g., across multiple processes running on a computer system.

Consequently, there is a need for improved smartcard caching methods and apparatuses.

SUMMARY

Improved smartcard caching methods and apparatuses are described. The methods and apparatuses significantly reduce smartcard I/O by implementing robust global caching techniques. The resulting global smartcard cache is substantially secure and resistant to attempts to maliciously access/modify it. The global smartcard cache is also resistant to attempts by unprivileged consumers to discover private or other like data.

The global smartcard cache is different from previous caches such as those used for file-systems and disk drives. For example, disk caches are able to distinguish between read and write operations and take the appropriate action for each. To the contrary, the global smartcard cache logic is not always able to make such distinctions due to the proprietary, non-standardized nature of current smartcard commands. In certain exemplary implementations, this issue is addressed by associating a freshness indicator (e.g., counter or other like verifiable attribute/data technique) with each cached item. Thus, a change in the freshness indicator may be indicative of a potential change in the corresponding data item.

In certain other exemplary implementations, the global smartcard cache is able to cache data stored by any consumer so that any other privileged consumer may access/use it, even after the computing system has been rebooted, or otherwise lost power, any number of times. The global smartcard cache logic is also able to find and store data across multiple systems, for example, in a client-server model.

The above stated needs and others are met, therefore, for example, by an apparatus that includes memory and logic. The logic is configured to determine a freshness indicator associated with at least selected item data previously output by a smartcard and store the freshness indicator and the selected item data as part of an item in a cache in the memory.

In certain implementations, the logic is further configured to receive a request for the selected item data, determine if the selected item data is stored in the cache, determine if the selected item stored in the cache is current based on the stored freshness indicator, output the selected item data if determined to be current, output a smartcard access request associated with the selected item data if the selected item data is not stored in the cache, and output a smartcard access request associated with the selected item data if the selected item data that is stored in the cache is not determined to be current.

In still other implementations, the logic is further configured to receive the selected item data in response to a smartcard access request associated with the selected item data, add the new item data to the cache, and receive the freshness indicator from the smartcard. The logic may also be configured to output a request for a new freshness indicator associated with at least the selected item data from the smartcard, receive the new freshness indicator, and compare the new freshness indicator with the stored freshness indicator.

In some implementations, for example, as part of the item in the cache maintained by the computing system, the logic is further configured to store at least one type of data, such as, e.g., smartcard identifier data, item identifier data, item length data, context handle data, access control information data, meta data, and other like useful data.

In certain implementations, the cache includes a plurality of partitions and at least two of the partitions are associated with different freshness indicators.

In still other implementations, the logic is further configured to selectively cause the smartcard to modify the freshness indicator. The logic may also be configured to selectively store content of the cache to a persistent memory medium of the computing system.

The above stated needs and others are also addressed by a smartcard that includes persistent memory and logic that is configured to selectively maintain, within the persistent memory, at least one freshness indicator associated with at least one item data that can be requested by an external entity. Here, for example, the freshness indicator may include a selectively modifiable attribute or other like feature or data.

BRIEF DESCRIPTION OF THE DRAWINGS

A more complete understanding of the various methods and apparatuses of the present invention may be had by reference to the following detailed description when taken in conjunction with the accompanying drawings wherein.

DETAILED DESCRIPTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
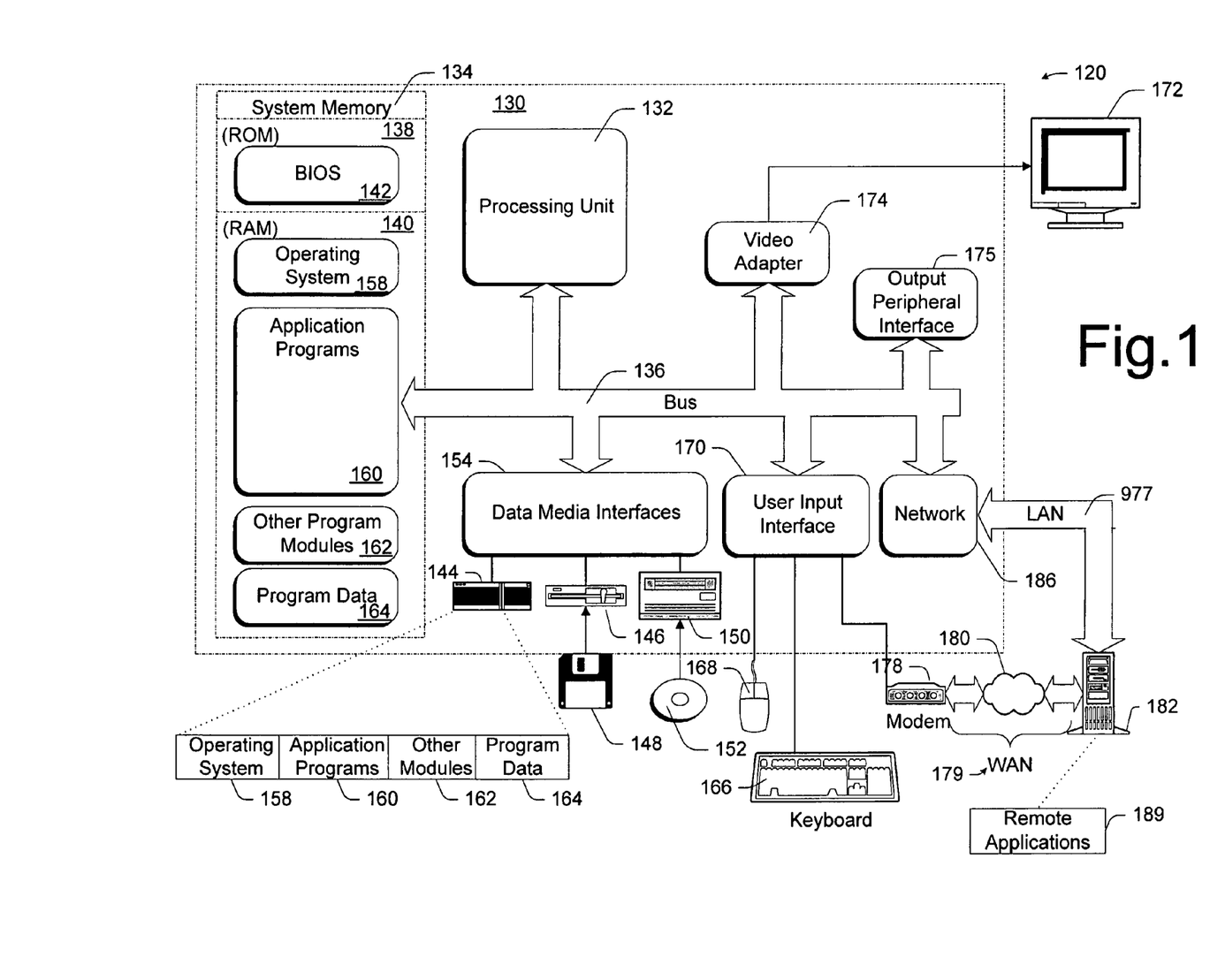
FIG. 1 is a block diagram that depicts a contemporary computer system that can be used with a smartcard or other like portable mechanism.

FIG. 1 illustrates an example of a suitable computing environment 120 with which the subsequently described methods and apparatuses may be implemented.

Exemplary computing environment 120 is only one example of a suitable computing environment and is not intended to suggest any limitation as to the scope of use or functionality of the improved methods and apparatuses described herein. Neither should computing environment 120 be interpreted as having any dependency or requirement relating to any one or combination of components illustrated in computing environment 120.

The improved methods and apparatuses herein are operational with numerous other general purpose or special purpose computing system environments or configurations. Examples of well known computing systems, environments, and/or configurations that may be suitable include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132.

Bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) l bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media.

In FIG. 1, system memory 134 includes computer readable media in the form of volatile memory, such as random access memory (RAM) 140, and/or non-volatile memory, such as read only memory (ROM) 138. A basic input/output system (BIOS) 142, containing the basic routines that help to transfer information between elements within computer 130, such as during start-up, is stored in ROM 138. RAM 140 typically contains data and/or program modules that are immediately accessible to and/or presently being operated on by processor 132.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM, CD-R, CD-RW, DVD-ROM, DVD-RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 138, or RAM 140, including, e.g., an operating system 158, one or more application programs 160, other program modules 162, and program data 164.

The improved methods and apparatuses described herein may be implemented within operating system 158, one or more application programs 160, other program modules 162, and/or program data 164.

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 175.

Computer 130 may operate in a networked environment using logical connections to one or more remote computers, such as a remote computer 182. Remote computer 182 may include many or all of the elements and features described herein relative to computer 130.

Logical connections shown in FIG. 1 are a local area network (LAN) 177 and a general wide area network (WAN) 179. Such networking environments are commonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180.

In a networked environment, program modules depicted relative to computer 130, or portions thereof, may be stored in a remote memory storage device. Thus, e.g., as depicted in FIG. 1, remote application programs 189 may reside on a memory device of remote computer 182. It will be appreciated that the network connections shown and described are exemplary and other means of establishing a communications link between the computers may be used.

Figure 2:
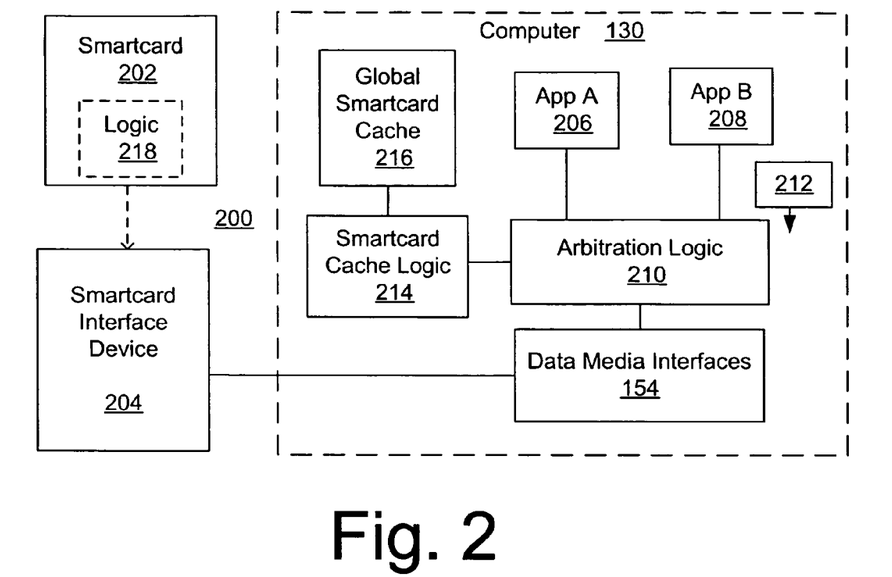
FIG. 2 is a block diagram depicting an example of a computing system, as in FIG. 1, being configured to support a global smartcard cache.

Attention is now drawn to FIG. 2, which is a block diagram depicting an example of a system 200, as in FIG. 1, being configured to support smartcard cache logic 214 and a global smartcard cache 216.

As shown, system 200 includes computer 130 having, in this example, data media interfaces 154 operatively coupled to a smartcard interface device 204. Smartcard interface device 204 is configured to operatively couple to smartcard 202. Illustrated within computer 130, are applications (App A 206 and App B 208), which are each operatively configured to run using the resources of computer 130 as needed. Being so configured, both App A 206 and App B 208 are able to request access to smartcard 202 through arbitration logic 210, data media interfaces 154 and smartcard interface device 204. In certain implementations, for example, arbitration logic 210 may be provided as part of the operating system, as an application programming interface (API), and/or other suitable program mechanism. Transaction 212 is illustrative of an access request by App B 208 to smartcard 202.

In this example, smartcard cache logic 214 is illustrated as being operatively coupled to arbitration logic 210. This is just one example as to how smartcard cache logic 214 may be implemented. In other systems smartcard cache logic 214 may be operatively coupled to other programs, logic, etc. Smartcard cache logic 214 is also illustrated as being coupled to global smartcard cache 216, which is created and maintained by smartcard cache logic 214.

As described in more detail below, generally speaking when an entity (e.g., application, program, process, consumer, etc.) seeks to access smartcard 202 with transaction 212, for example, the access request will be handled at least in-part by smartcard cache logic 214, which will determine if the item requested is available in global smartcard cache 216. If the requested item is available in global smartcard cache 216 then the item will be provide to the requesting entity. If the requested item is not available in global smartcard cache 216 then the item will need to be provided by smart card 202.

There are features described herein that ensure that an item provided from global smartcard cache 216 are current and that the requesting entity is authorized to access the item. For example, to ensure that the relevant data in a cached item is current (i.e., that it matches that which smartcard 202 would provide at the time of the access request), a freshness counter or other like verifiable attribute can be used to test if the data in the requested item may have been altered since it was last copied to global smartcard cache 216. This "freshness counter" is maintained and persisted on smartcard 202 and updated accordingly by logic that can be implemented on the smartcard itself and/or in another applicable device, such as, e.g., computer 130. Logic 218 as shown in smartcard 202, for example, can be configured to maintain and store (persistently) one or more freshness counters or like mechanisms in the static memory of the smartcard.

When an item is stored in global smartcard cache 216 so too is the current applicable freshness counter. As such, during a subsequent request for the item, the previously cached freshness counter for the item can be compared to a corresponding newly retrieved freshness counter from smartcard 202. If the two freshness counters match, then there should be no difference between the cached item and the item that the smartcard would provide if requested to do so. Consequently, the cached item can be provided to the requesting entity to satisfy the access request. This tends to improve performance substantially, without compromising reliability.

Before describing in greater detail some exemplary implementations of global smartcard cache 216, a distributed global smartcard cache arrangement will be described. Thus, attention is drawn to FIG. 3, which is a block diagram depicting an exemplary networked computer environment 300 supportive of one or more global smartcard caches.

Figure 3:
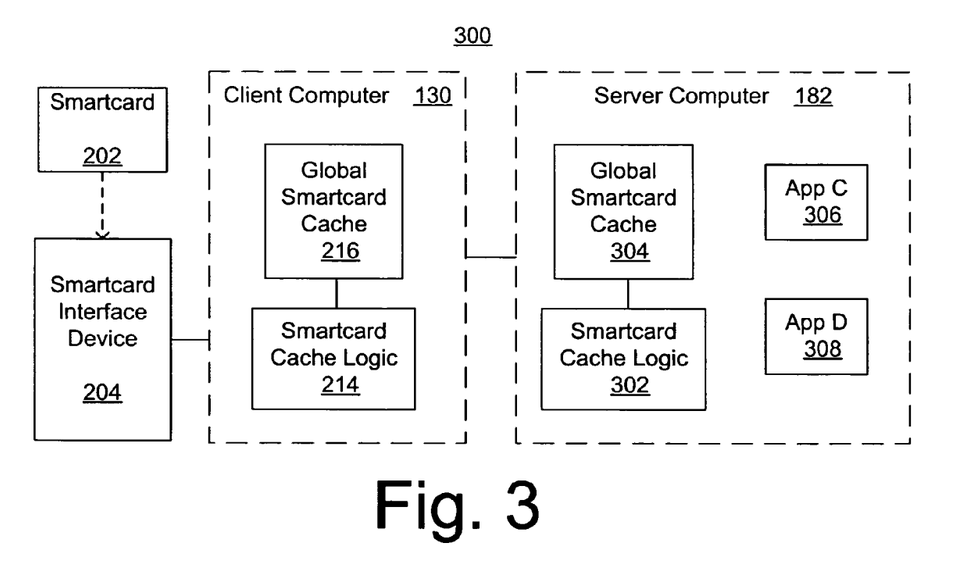
FIG. 3 is a block diagram depicting an exemplary networked computer environment supportive of global smartcard cache(s).

Networked computer environment 300 includes a computer 130 acting as a client computer operatively coupled to a server computer 182. As above, computer 130 includes smartcard cache logic 214 and global smartcard cache 216, and is operatively coupled to smartcard interface device 204 which provides connectivity to smartcard 202. Server computer 182 also includes corresponding smartcard cache logic 302 and global smartcard cache 304. Server computer 182 is also running App C 306 and App D 308 in this example.

FIG. 3 illustrates that smartcard cache logic 302 can create global smartcard cache 304 for a remote smartcard 202, and that App C 306, for example, can request access to remotely located smartcard 202 and possibly save time when provided with a requested item from global smartcard cache 304 if available. If a requested item is not available (e.g., not cached or determined to be not current) in global smartcard cache 304, then smartcard cache logic 302 can provide the request to smartcard cache logic 214 in client computer 130, which will then determine if the requested item is available in global smartcard cache 216. If the requested item is available in global smartcard cache 216, then it is provided to the requesting entity (e.g., App C 306) and is also cached in global smartcard cache 304 of server computer 182. If the requested item is not available from either global smartcard caches (304 or 216), then smartcard 202 will output the requested item data that is provided to the requesting entity, and the item will be cached in both global smartcard caches (304 or 216).

Figure 4:
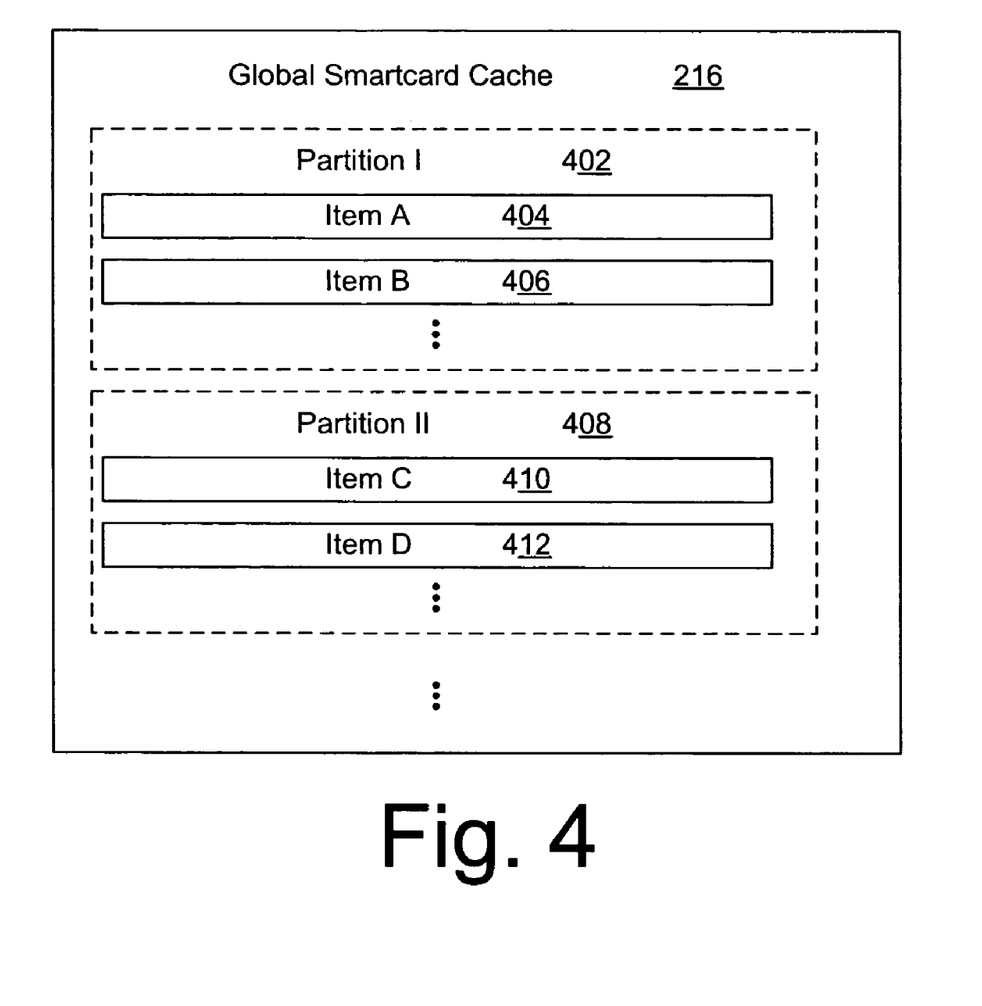
FIG. 4 is a block diagram illustratively depicting certain exemplary features of a global smartcard cache.

Reference is now made to FIG. 4, which is a block diagram illustratively depicting certain exemplary features of an exemplary global smartcard cache 216.

In this example, global smartcard cache 216 includes one or more partitions 402 and 408 corresponding to one or more regions/functions/users/etc. of the services/items that smartcard 202 may provide. Partitioning is not required, but may improve performance in certain implementations. Each partition 402 and 408 in this example include one or more cached items. For example, partition I 402 includes item A 404 and item B 406. Similarly, partition II 408 includes item C 410 and item D 412.

Figure 5:
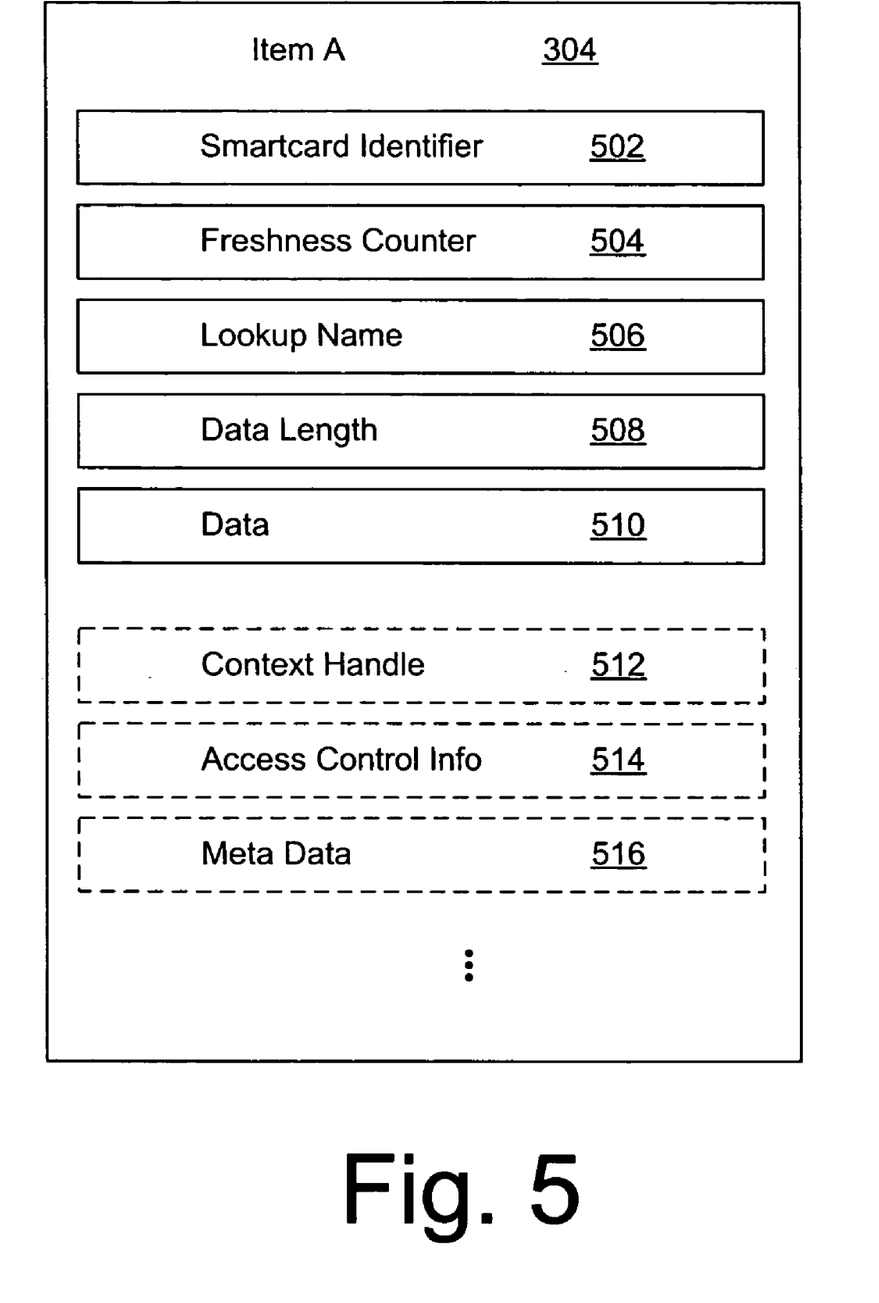
FIG. 5 is a block diagram illustratively depicting certain exemplary features of an item within a global smartcard cache.

FIG. 5 is a block diagram illustratively depicting certain exemplary features of an exemplary item A 404 within global smartcard cache 216.

Here, item A 404 includes a smartcard identifier 502 that at least substantially uniquely identifies the smartcard that provided item data 510. By way of example, smartcard identifier 502 may include the UUID of smartcard 202 or other like identifying information. Item A 404 also includes a freshness counter 504, which is used to determine if cached item data 510 is current. A lookup name 506 or other item data identifier is also included in this example of item A 404. This can be the name of the item as requested by an entity, for example. Item A 404 also include item data 510 and in this example a data length 508 that specifies the length of item data 510.

Other information may be included in cached item A 404. For example, as shown in FIG. 5, in certain implementations a context handle 512 may be included to identify a smartcard subsystem context handle. Access control information 514 may also be included in item A 404 to specify entities/users/groups/accounts/etc. that are authorized to access the cached item or portions thereof. In certain implementations an access control list (e.g., with SIDs) or other like mechanism can be employed as access control information 514. Determining access control to item A 404 may be handled by smartcard cache logic 214, for example, or other applicable logic. Item A 404 may also include other forms of meta data 516, such as, e.g., a timestamp, etc.

Figure 6:
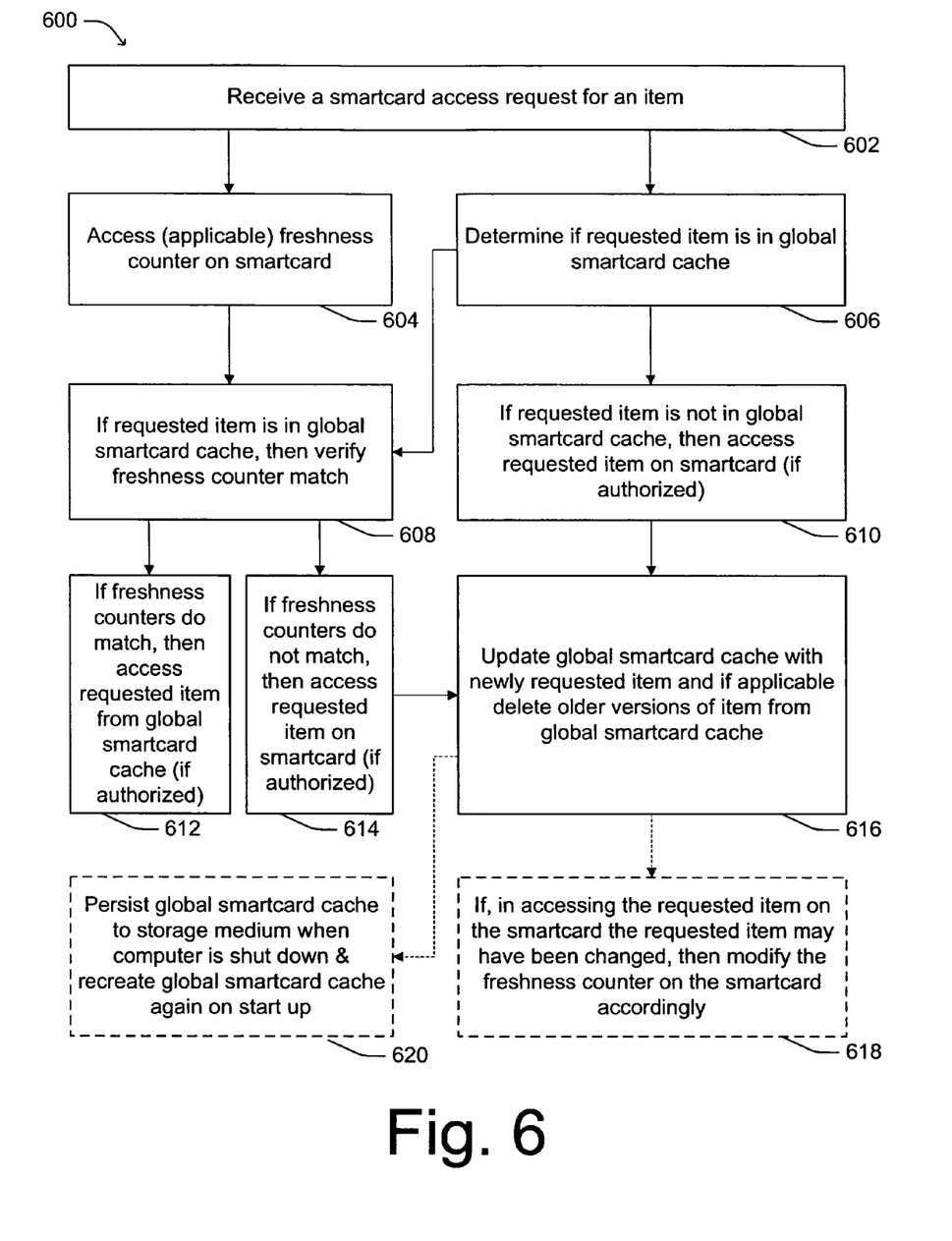
FIG. 6 is a flow diagram depicting certain exemplary acts associated with a method for use in global smartcard cache logic, for example, as in FIGS. 2 and 3.

Attention is drawn next to FIG. 6, which is a flow diagram depicting certain exemplary acts associated with a method 600 for use in global smartcard cache logic 214, for example, as in FIGS. 2 and 3.

In act 602, a smartcard access request associated with some desired item data is received, for example, from some entity. The access request in this example may identify the smartcard, the requested item data, and/or the requesting entity. Other or different information may be included in an access request. In act 604, the applicable freshness counter is accessed from the specified smartcard. Note that in certain other implementations, various acts may be added, omitted, adapted, and/or performed in a certain order or simultaneously. For example, act 604 may occur prior to act 602. The figures provided herein are for certain exemplary implementations.

In act 606 it is determined if the requested item is stored in the global smartcard cache. If the requested item is stored in the global smartcard cache, then in act 608 a verification of the freshness counter is completed. Here, for example, the freshness counter accessed from the smartcard in act 604 may be compared to a corresponding freshness counter stored in the requested item found in global smartcard cache in act 606.

If the requested item is not found in the global smartcard cache in act 606, then in accordance with act 610, the smartcard is accessed accordingly and the requested item returned.

In act 612, if the freshness counters compared in act 608 are verified (e.g., match) then the requested item is provided to the requesting entity from the global smartcard cache accordingly. To the contrary, if the freshness counters in act 608 are not verified, then in act 614 the smartcard is accessed accordingly and the requested item returned.

When the smartcard is accessed and the requested item returned per acts 610, 614, then in act 616 the global smartcard cache is updated with the latest requested item. The update may include, for example, deleting an older version of the item from the global smartcard cache.

Act 618 is optional in some implementations. In act 618, an applicable freshness counter in the smartcard is altered whenever the actions of the smartcard may have changed the item data. The freshness counter can be implemented in a variety of ways, each having a specific manner in which it is altered to reflect that there may have been a change made to item data, for example within a specific partition. As mentioned, act 618 may be a function of the smartcard cache logic and/or a function of logic 218 of smartcard 202. In other implementations, act 618 may also be conducted by or initiated by the requesting entity as part of an operation/transaction associated with an access request that has the potential of causing a change to the item data within the smartcard.

As illustrated herein, a freshness counter may take on various forms and include various types of data. In certain implementations there is a single freshness counter, while in other implementations there may be multiple freshness counters, e.g., one freshness counter per partition.

In act 620, which is optional and may be performed by various different logic supportive of the smartcard cache logic, the global smartcard cache is persisted to a storage medium, such as, e.g., a hard disk drive, when the computing system is shut down, and/or at other useful times. As such, the smartcard global cache can be recreated/re-populated later on without accessing the smartcard, for example, while rebooting the computing system.

In accordance with certain other aspects of the methods and apparatuses provided herein, freshness indication may also be implemented through some applicable counter mechanism that is not provided for and/or stored on the smartcard, but rather maintained by other logic, such as, a smartcard subsystem of the operating system of the computer. For example, a counter or other like indicator of transmissions (e.g., read or write) to the smartcard may be employed to track the freshness of the data in the global smartcard cache. This approach may be less optimal, however. For example, it cannot differentiate between reads and writes, and does not allow cache persistency past removal of the smartcard. One benefit is that there is no need to maintain a smartcard based counter.

Although some preferred implementations of the various methods and apparatuses have been illustrated in the accompanying Drawings and described in the foregoing Detailed Description, it will be understood that the invention is not limited to the exemplary implementations disclosed, but is capable of numerous rearrangements, modifications and substitutions without departing from the spirit of the invention as set forth and defined by the following claims.

What is claimed is:

1. A method comprising:
   storing, in a computing system, a first freshness indicator associated with item data previously output by a smartcard and the previously output item data as part of an item in a cache maintained by said computing system, the first freshness indicator indicating a time at which a most recent update occurred to the previously output item data or a version attribute of the previously output item data;
   maintaining a second freshness indicator associated with a current version of the item data, the second freshness indicator and the current version of the item data being stored on the smartcard, the second freshness indicator indicating a time at which a most recent update occurred to the current version of the item data or a version attribute associated with the current version of the item data; and
   comparing, by the computing system, the first and second freshness indicators to determine whether the previously output item data stored in the cache is the same as the current version of the item data that is stored on the smartcard.

2. The method as recited in claim 1, further comprising:
   receiving a request for said item data;
   determining if said item data is stored in said cache;
   outputting said item data if the data is stored in said cache and the comparing indicates that the previously output item data is the same as the current version of the item data.

3. The method as recited in claim 2, further comprising:
   outputting a smartcard access request associated with said item data if said item data is not stored in said cache.

4. The method as recited in claim 2, further comprising:
   outputting a smartcard access request associated with said item data if said item data that is stored in said cache is not the same as the current version of the item data.

5. The method as recited in claim 1, further comprising:
   receiving item data from the smartcard in response to a smartcard access request associated with said item data; and
   adding said received item data to said cache.

6. The method as recited in claim 1, further comprising:
   receiving said first freshness indicator from said smartcard.

7. The method as recited in claim 1, further comprising:
   as part of said item in said cache maintained by said computing system, storing at least one type of data selected from a group of different types of data comprising smartcard identifier data, item identifier data, item length data, context handle data, access control information data, meta data, and item data.

8. The method as recited in claim 1, wherein said cache includes a plurality of partitions.

9. The method as recited in claim 8, wherein at least two of said plurality of partitions are associated different partition freshness indicators.

10. The method as recited in claim 1, wherein said computing system includes a client computing system.

11. The method as recited in claim 1, wherein said computing system includes a server computing system.

12. The method as recited in claim 1, further comprising:
    selectively causing said smartcard to modify said second freshness indicator.

13. The method as recited in claim 1, further comprising:
    selectively storing content of said cache to a persistent memory medium of said computing system.

14. The method as recited in claim 1, wherein said first freshness indicator includes a freshness counter.

15. The method as recited in claim 1, wherein said first freshness indicator includes a selectively modifiable persistently maintained attribute output by said smartcard.

16. A computer-readable medium having computer-implementable instructions for causing at least one processing unit to perform acts comprising:
    storing, in a computing system, a first freshness indicator associated with item data previously output by a smartcard and the previously output item data as part of an item in a cache maintained by said computing system, the first freshness indicator indicating a time at which a most recent update occurred to the previously output item data or a version attribute of the previously output item data;
    maintaining a second freshness indicator associated with a current version of the item data, the second freshness indicator and the current version of the item data being stored on the smartcard, the second freshness indicator indicating a time at which a most recent update occurred to the current version of the item data or a version attribute associated with the current version of the item data; and
    comparing the first and second freshness indicators to determine whether the previously output item data stored in the cache is the same as the current version of the item data that is stored on the smartcard.

17. The computer-readable medium as recited in claim 16, having further computer-implementable instructions for causing at least one processing unit to perform acts comprising:
    receiving a request for said item data;
    determining if said item data is stored in said cache;
    outputting said item data if the data is stored in said cache and the comparing indicates that the previously output item data is the same as the current version of the item data;
    outputting a smartcard access request associated with said item data if said item data is not stored in said cache; and
    outputting a smartcard access request associated with said item data if said item data that is stored in said cache is not the same as the current version of the item data.

18. The computer-readable medium as recited in claim 16, having further computer-implementable instructions for causing at least one processing unit to perform acts comprising: receiving said item data from the smartcard in response to a smartcard access request associated with item data; adding said received item data to said cache; and update said first freshness indicator with said second freshness indicator received from the smartcard.

19. The computer-readable medium as recited in claim 16, having further computer-implementable instructions for causing at least one processing unit to perform acts comprising:
as part of said item in said cache maintained by said computing system, storing at least one type of data selected from a group of different types of data comprising smartcard identifier data, item data identifier data, item data length data, context handle data, access control information data, and meta data.

20. The computer-readable medium as recited in claim 16, wherein said cache includes a plurality of partitions.

21. The computer-readable medium as recited in claim 20, wherein at least two of said plurality of partitions are associated different partition freshness indicators.

22. The computer-readable medium as recited in claim 16, having further computer-implementable instructions for causing at least one processing unit to perform acts comprising:
selectively causing said smartcard to modify said second freshness indicator.

23. The computer-readable medium as recited in claim 16, having further computer-implementable instructions for causing at least one processing unit to perform acts comprising:
selectively storing content of said cache to a persistent memory medium of said computing system.

24. The computer-readable medium as recited in claim 16, wherein said first freshness indicator includes a selectively modifiable persistently maintained attribute output by said smartcard.

25. An apparatus comprising:
memory; and
logic operatively coupled to said memory and configured to:
store a first freshness indicator associated with item data previously output by a smartcard and the previously output item data as part of an item in a cache in said memory, the first freshness indicator indicating a time at which a most recent update occurred to the previously output item data or a version attribute of the previously output item data;
maintain a second freshness indicator associated with a current version of the item data, the second freshness indicator and the current version of the item data being stored on the smartcard. the second freshness indicator indicating a time at which a most recent update occurred to the current version of the item data or a version attribute associated with the current version of the item data; and
compare the first and second freshness indicators to determine whether the previously output item data stored in the cache is the same as the current version of the item data that is stored on the smartcard.

26. The apparatus as recited in claim 25, wherein said logic is further configured to receive a request for said item data, determine if said item data is stored in said cache, output said item data if the data is stored in said cache and the comparing indicates that the previously output item data is the same as the current version of the item data; output a smartcard access request associated with said item data if selected item data is not stored in said cache, and output a smartcard access request associated with said item data if said item data that is stored in said cache is not the same as the current version of the item data.

27. The apparatus as recited in claim 25, wherein said logic is further configured to receive said item data from the smartcard in response to a smartcard access request associated with said item data, add said received new-item data to said cache, and update said first freshness indicator with said second freshness indicator received from the smartcard.

28. The apparatus as recited in claim 25, wherein said logic is further configured to store at least one type of data selected from a group of different types of data comprising smartcard identifier data, item data identifier data, item data length data, context handle data, access control information data, and meta data.

29. The apparatus as recited in claim 25, wherein said cache includes a plurality of partitions.

30. The apparatus as recited in claim 29, wherein at least two of said plurality of partitions are associated different partition freshness indicators.

31. The apparatus as recited in claim 25, wherein said logic is further configured to selectively cause said smartcard to modify said second freshness indicator.

32. The apparatus as recited in claim 25, wherein said logic is further configured to selectively store content of said cache to a persistent memory medium of said apparatus.

33. The apparatus as recited in claim 25, wherein said first freshness indicator includes a selectively modifiable persistently maintained attribute output by said smartcard.

34. A system comprising:
a smartcard comprising:
persistent memory, and
logic configured to selectively maintain in said persistent memory at least a first freshness indicator associated with a current version of item data that can be requested by an external entity, the first freshness indicator indicating a time at which a most recent update occurred to the current version of the item data or a version attribute associated with the current version of the item data;
a client computer operatively coupled to the smartcard, comprising:
a first global smartcard cache, and
first smartcard cache logic configured to store in the first global smartcard cache a second freshness indicator associated with a previously output version of the item data, the second freshness indicator indicating a time at which a most recent update occurred to the previously output version of the item data or a version attribute of the previously output version of the item data; and
a server computer operatively coupled to the client computer, comprising:
a second global smartcard cache, and
second smartcard cache logic configured to store in the second global smartcard cache a third freshness indicator associated with the previously output version of the item data, the third freshness indicator indicating a time at which a most recent update occurred to the previously output version of the item data or a version attribute of the previously output version of the item data,
wherein one or both of the client computer and the server computer are configured to compare the first and second or first and third freshness indicators to determine whether the previously output item data stored in the first or second global smartcard cache is the same as the current version of the item data that is stored on the smartcard persistent memory.

35. The smartcard as recited in claim 34, wherein said first freshness indicator includes a selectively modifiable attribute.

* * * * *